United States Patent
Hagemeyer Cook et al.

[11] Patent Number: 5,701,235
[45] Date of Patent: Dec. 23, 1997

[54] LOW COST FLEXIBLE LIGHTING METHOD FOR APPLIANCES

[75] Inventors: Lori Ann Hagemeyer Cook, Scott Township, Vanderburgh County; Ronald W. Guess, Evansville; Stephen G. Williams, Ohio Township, Warrick County, all of Ind.

[73] Assignee: Whirlpool Corporation, Benton Harbor, Mich.

[21] Appl. No.: 585,959

[22] Filed: Jan. 16, 1996

Related U.S. Application Data

[63] Continuation of Ser. No. 362,921, Dec. 23, 1994, abandoned.
[51] Int. Cl.$^6$ .................................................. F21V 8/00
[52] U.S. Cl. ........................... 362/26; 362/23; 362/32; 362/92
[58] Field of Search ............................ 362/92, 94, 23, 362/26, 28, 29, 30, 32, 394

[56] References Cited

U.S. PATENT DOCUMENTS

| | | |
|---|---|---|
| 2,214,595 | 9/1940 | Rights ........................... 362/27 |
| 3,808,877 | 5/1974 | Kwong . |
| 3,919,681 | 11/1975 | Nishioka et al. . |
| 4,128,859 | 12/1978 | Rietmuller ..................... 362/32 X |
| 4,180,847 | 12/1979 | Cresko et al. ................... 362/30 |
| 4,706,169 | 11/1987 | Bussan et al. .................. 362/26 |
| 4,800,466 | 1/1989 | Bauer et al. .................... 362/26 |
| 4,841,415 | 6/1989 | Dobner .......................... 362/90 |
| 4,917,448 | 4/1990 | Oppenheimer ................. 362/32 X |
| 4,935,850 | 6/1990 | Smith, Jr. ...................... 362/32 X |
| 5,027,259 | 6/1991 | Chujko ........................... 362/32 |
| 5,111,526 | 5/1992 | Yamamoto et al. ............ 385/145 |
| 5,388,418 | 2/1995 | Martin et al. .................. 362/94 |

Primary Examiner—Thomas M. Sember
Attorney, Agent, or Firm—Hill, Steadman & Simpson

[57] ABSTRACT

A low cost, flexible lighting apparatus and method is provided. A light source and at least one extruded optical fiber having a first end and a second end are provided. The first end is arranged so that light from the light source enters the first end and is transmitted through the optical fiber so that it exits the second end. The second end is arranged so as to illuminate an indicator with light transmitted from the light source via the extruded optical fiber. This arrangement is advantageously used in an appliance such as a refrigerator to illuminate the control panel dials with the optical fibers in a high quality, cost effective method.

15 Claims, 2 Drawing Sheets

LOW COST FLEXIBLE LIGHTING METHOD FOR APPLIANCES

This is a continuation of application Ser. No. 08/362,921, filed Dec. 23, 1994 now abandoned.

BACKGROUND OF THE INVENTION

The present invention relates to lighting systems and more particularly to a high quality, low cost, flexible lighting method for appliance controls using light generated by a remote compartment lamp and transmitted through extruded optical fibers.

Various household appliances including refrigerators are provided with index dials that are manually operated by a user to obtain a selected performance setting of the appliance. For both practical and cosmetic reasons, it is desirable to provide backlighting for the index information on such control dials so that the user knows precisely which setting is selected. This is especially true when the ambient lighting is inadequate to fully illuminate the index surface of the dial. Also for safety and convenience, it is particularly desirable to backlight only a selected portion of the index surface of the dial without having to locate the electrically-powered light bulbs immediately adjacent thereto.

Several types of appliances including refrigerators have control panels that are commonly illuminated from the back. An example of a method currently used to light a control box thermostat and baffle adjustment opening in a present refrigerator is an injection-molded, transparent acrylic lightpipe system. The most convenient light source for use with such a lightpipe in appliances is generally the compartment lamp for the appliance, i.e., the refrigerator compartment light bulb. The lightpipe transmits light from the refrigerator compartment light bulb to the front of the refrigerator through calculated geometric surfaces strategically placed to get light where it is needed while still allowing room for the required control box components. The known lightpipes are large, inflexible, and confining. It is, therefore, difficult and costly to design the lightpipes with intricate serpentine shapes to avoid obstructions and still provide the light where it is needed. In addition, multiple lightpipes used in a single control are unlikely to have the same shape within the control box and thus, will not uniformly transmit light. This results in quality and production problems. In addition, the price of these unique parts is quite high. Also, the manufacturing process required for their production is difficult to keep in control.

U.S. Pat. No. 3,040,458 discloses a back-lit dial wherein light is transmitted to the dial face by constructing the dial of transparent material. However, this requires placement of the light source immediately behind the dial.

U.S. Pat. No. 3,278,738 teaches that light exiting a lightpipe will deviate in the direction of the thickest portion of the lightpipe. This reference further teaches that the principle may be used to increase or decrease the intensity of illumination on the illuminated area.

U.S. Pat. No. 4,706,169 discloses a lightpipe such as the lightpipe from a refrigerator bulb to control dials. However, the lightpipes are inflexible and typically are of a different shape resulting in the problems discussed above.

SUMMARY OF THE INVENTION

It is an object of the present invention to provide a low cost, flexible lighting method for illuminating a control dial of a household appliance, such as a refrigerator, by means of light generated remotely in a compartment lamp of the appliance.

The present invention provides a high quality, low cost, flexible lighting method that can be advantageously used in appliance control panels. The present invention has a flexible extruded optical fiber for transmitting light from a refrigerator compartment light bulb to backlight the forward face of a slide bar thermostat control. The optical fiber extends behind the slide bar to terminate so as to illuminate the slide bar indicator. In addition, the present invention provides a thin translucent material having at least one color between the end of the optical fiber and the front panel so that a color display is seen by the user.

The present invention also provides a low cost flexible lighting method having the steps of providing a light source and at least one extruded optical fiber having a first end and a second end. The first end is arranged so that the light from the light source enters the first end and the transmitted light then exits the second end. The second end is arranged to illuminate an indicator with the light transmitted from the light source.

Another embodiment of the present invention provides a plurality of extruded optical fibers to enable the lighting of a plurality of indicators with the light transmitted from the light source via the extruded optical fibers.

The present invention also provides a low cost flexible lighting apparatus having a light source and at least one extruded optical fiber with a first end optically coupled to the light source and a second end arranged to provide a source of light to an object.

The present invention has several advantages. For example, the extruded fiber optic assembly can replace the inflexible lightpipe presently used in refrigerator lighting systems. In addition, the present invention allows the continued use of the refrigerator compartment light bulb as a convenient light source. Also, the diameter of the optical fiber can be made small enough to allow for full control adjustment, part commonization, and brand/model differentiation. Also, the present invention can provide an assembly that can fit current and future controls.

Additional advantages of the present invention include a cost reduction. Also, lighting of new and different control panel locations is possible with the flexibility of the optical fibers. In addition, another advantage is that the fiber ends can be formed or masked to provide shapes. An additional advantage is that more than one fiber can be used. Moreover, the refrigerator control panel can inexpensively achieve an aesthetically "high-tech" look without actually using electronics. For example, a thin translucent material having at least one color can be located between the exit end of the fiber and the front panel so that the fiber appears to provide a color indication on the control panel. Preferably, the color translucent material is indicative of the relative temperature being indicated, i.e. red for warmer and blue for colder temperatures.

The objects of the present invention are inventively achieved in a low cost, flexible lighting method having the steps of providing a light source and at least one extruded optical fiber having a first end and a second end, the first end being arranged so that light from the light source enters the first end and the light transmitted through the fiber then exits the second end, the second end being arranged to illuminate an object with light transmitted from the light source via the at least one extruded optical fiber.

DETAILED DESCRIPTION OF THE PREFERRED EMBODIMENTS

Figure 1:
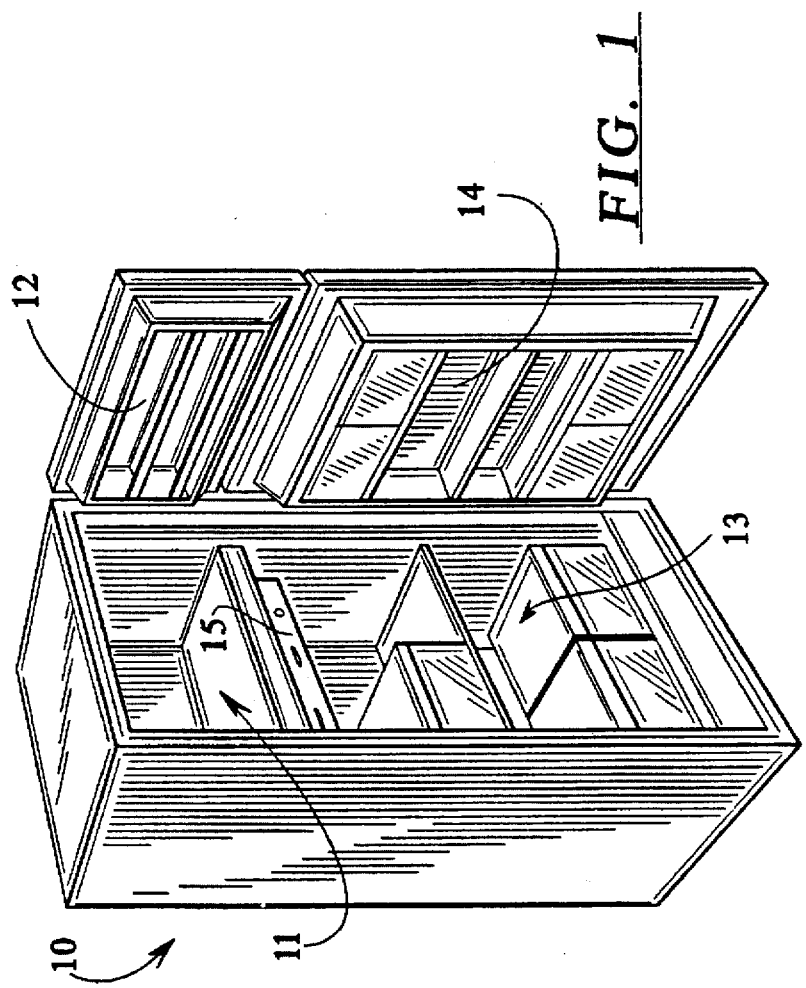
FIG. 1 is a perspective view of an appliance illustrating a refrigerator/freezer unit having a control panel in which a FIG. 2 is a front view of a control panel in which the principles of the present invention could be utilized.

FIG. 1 illustrates an appliance generally which shows a refrigerator/freezer unit 10. However, the present invention can be used in other types of appliances and applications.

The apparatus and method of this invention, to be described in further detail below, is most advantageously employed in a refrigerator/freezer unit 10. The refrigerator/freezer unit 10 illustrated in FIG. 1 has a freezer compartment 11 with a freezer door 12 and a refrigerator compartment 13 with a refrigerator door 14. The freezer compartment 11 is typically located above the refrigerator compartment 13. However, refrigerator/freezer units 10 are also available with the freezer compartment 11 on the bottom or side-by-side with the refrigerator compartment 13.

The refrigerator/freezer unit 10 has a control panel 15 mounted in its interior. The present invention can be most advantageously utilized on the control panel 15. The control panel 15 is typically located immediately below the freezer compartment 11 within the refrigerator compartment 13. The present invention relates to backlighting illumination for the indications on controls of the control panel 15.

Figure 2:
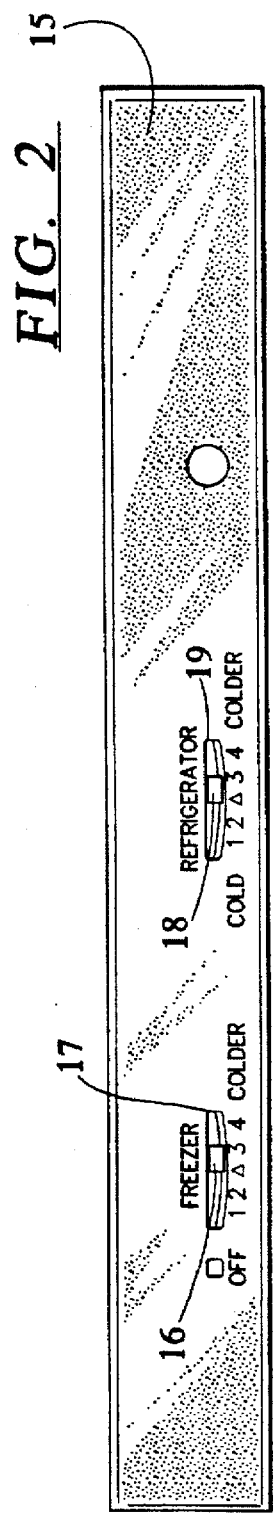

Referring now to FIG. 2, an embodiment of the control panel 15 is illustrated in a front view. The control panel 15 commonly has several controls with which the user can adjust the refrigerator and freezer temperatures, etc. For example, a freezer control indicator 16 is located within a freezer temperature control slot 17 and a refrigerator control indicator 18 is located within a refrigerator temperature control slot 19. In the embodiment shown, the control indicators 16, 18 utilize slide bar thermostats. The control indicators 16, 18 provide the user with a useful indication of the temperature setting by the indicators' 16, 18 position relative to the index of temperature values provided on the control panel 15. Other additional indicators are of course possible for use on the control panel 15.

Figure 3:
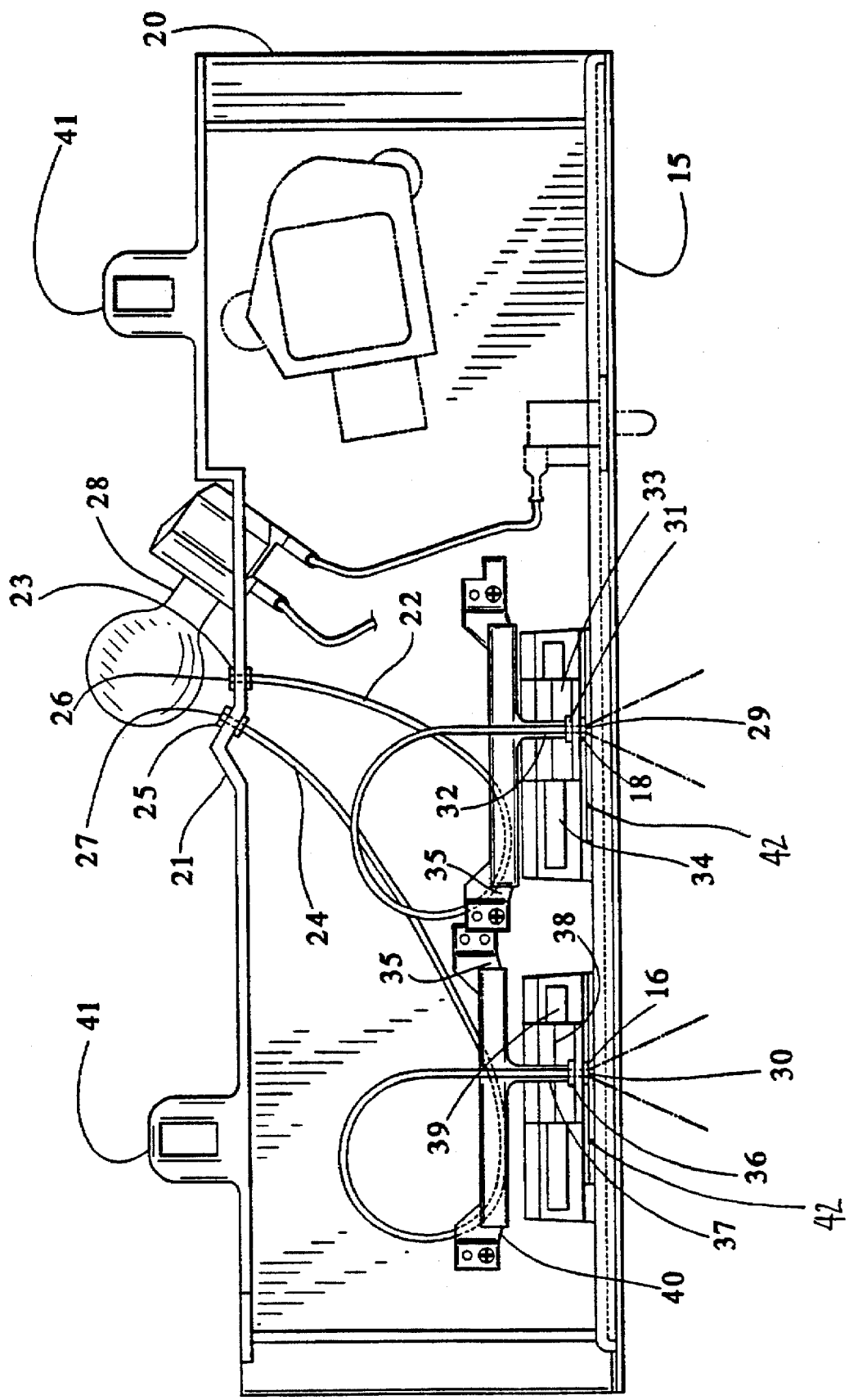
FIG. 3 is a plan view of a control panel housing in which a low cost, flexible lighting method embodying the principles of the present invention could be utilized.

FIG. 3 illustrates a plan view of the control panel 15 mounted to a control panel housing 20. In addition, FIG. 3 illustrates a first optical fiber 22. The first optical fiber 22 is held by a first resilient grommet 23 to secure a first light coupling end 26 to a wall 21 of the housing 20. The end 26 of first fiber 22 is thus generally perpendicular to the wall 21 of the housing 20. Similarly illustrated is a second optical fiber 24 having a light coupling end 27 mounted in a second resilient grommet 25 to secure the end 27 of the second fiber to the wall 21 of housing 20.

A refrigerator compartment light bulb 28 is located preferably near the rear of the refrigerator compartment 13 to provide general illumination to that area when the refrigerator door 14 is opened. In addition, the bulb 28, which is mounted outside of the control panel housing 20, can couple into the optical fibers 22, 24. The light coupling ends 26, 27 provide an area within which the light emanating from the refrigerator compartment light bulb 28 can couple into the optical fibers 22, 24. Since the optical fibers 22, 24 are preferably cylindrical, the light coupling ends 26, 27 have a circular area for accepting the light. The light coupled into the fibers 22, 24 is then transmitted within the length of the optical fibers 22, 24. In addition, the first optical fiber 22 has a light exiting end 29 and the second optical fiber 24 similarly has a light exiting end 30.

FIG. 3 also illustrates certain structural aspects of the present invention. For example, the refrigerator control indicator 18 is located opposite a first exit end resilient grommet 31. The first exit end grommet 31 is provided to receive and secure an exit end 29 of the first optical fiber 22 to a first indicator bar 32. The first indicator bar 32 is connected to a refrigerator slide thermostat 33 that travels substantially horizontally along a first guide track 34 to indicate, along the index of the control panel 15, the relative level of coldness selected for the refrigerator compartment 13.

To secure the refrigerator slide thermostat 33 to the control housing 20, a refrigerator control mounting bracket 35 is provided. Similar components are provided for the freezer control indicator 16. For example, a second exit end resilient grommet 36 receives and secures an exit end 30 of the second optical fiber 24 to a second indicator bar 37. The second indicator bar 37 is connected to a freezer slide thermostat 38. The freezer slide thermostat 38 travels along a second guide track 39, and the complete assembly is held to the control panel housing 20 by a freezer control mounting bracket 40.

As illustrated, the optical fibers 22, 24 are flexible and are coiled in a single loop between the back and front of the control housing 20. Care must be exercised so that the loop is not too tight which would cause light to emanate from the optical fibers 22, 24 before the light being transmitted reaches the exit ends 29, 30. Thus, the ends 26, 27, 29, 30 are secured by the resilient grommets in fixed locations relative to the control housing 20 or indicator bars 32, 37, yet the intermediate portion is flexible and movable. By using the flexible grommets, the optical fibers are mounted and secured without the need for additional fasteners and the assembly can occur in a simple manner requiring minimal labor. The coiled loop also serves the purpose of facilitating the horizontal movement of the slide thermostats 33, 38 along the first guide track 34 and the second guide track 39, respectively. The coiled loop prevents a kinking of the optical fibers 22, 24 to provide better operation of the invention.

FIG. 3 also shows the housing 20 which has housing mounting tabs 41 to connect the housing 20 and the control panel 15 to the inside of the refrigerator compartment 13, preferably near the top, so that the user has easier access thereto for adjusting the controls.

FIG. 3 also illustrates a further advantageous feature of the flexible lighting system of the present invention. A thin translucent part 42 having at least one color is shown for each fiber 22, 24. The translucent parts 42 are located within the control housing 20 immediately behind the control panel 15 and in front of the exit ends 29, 30 of the fibers 22, 24. Preferably the color translucent parts 42 have colors that are indicative of the relative temperature being indicated at the illuminated freezer and refrigerator control slots 17, 19. For example the color red can be used for OFF and warmer temperature settings, while blue is used for the colder settings. This advantage further adds to the flexible, low cost benefits of the invention in that the thin transparent parts 42 can be made in any color desired without altering any other part of the invention.

Thus, the present invention provides a method for illuminating the indicators 16, 18 by providing extruded optical fibers 22, 24 to transmit light generated at a refrigerator compartment light bulb 28 to the indicators 16, 18. The indicators 16, 18 are provided with slide bar thermostats 33, 38. Thus, the user can change the temperature settings of the freezer and/or refrigerator and read the index temperature off the control panel 15 via the illuminated control indicators 16, 18. The optical fibers 22, 24 provide an illumination of the control indicators 16, 18 so that the user can better determine the temperature setting desired.

As is apparent from the foregoing specification, the invention is susceptible of being embodied with various alterations and modifications which may differ particularly from those that have been described in the specification. It should be understood that we wish to embody within the scope of the patent warranted hereon, all such modifications as reasonably and properly come within the scope of our contribution to the art.

The embodiments of the invention in which an exclusive property or privilege is claimed are therefore defined as follows:

1. A low cost, flexible lighting method for illuminating at least one indicator on a control panel in a refrigerator, comprising the steps of:
   providing a compartment in the refrigerator to maintain adjustable temperature levels therein and having a light source contained in the compartment;
   providing an adjustable temperature control associated with the control panel located in the compartment to set said adjustable temperature levels and having the at least one movable indicator connected thereto;
   providing at least one extruded optical fiber having a first end and a second end, said first end being arranged so that light emanating from said light source in the refrigerator compartment enters said first end and is transmitted through said optical fiber so that it exits said second end, said second end being arranged to move in conjunction with and to illuminate said at least one indicator with said transmitted light via said optical fiber when said adjustable temperature control is moved; and
   providing a colored translucent part adjacent to said second end and said at least one indicator such that said transmitted light will pass through said translucent part after exiting said second end to provide a colored illumination of said at least one indicator.

2. The method in claim 1 wherein the step of providing a translucent part further comprises the step of providing multiple colors on said translucent part at spaced locations thereon so that light exiting said second end of said optical fiber is incident on said translucent part to provide a differing color display dependent on a location of said movable indicator.

3. A low cost, flexible apparatus for lighting at least one indicator on a control panel in a refrigerator having a compartment constructed to maintain adjustable temperature levels therein set by a user via the control panel, said apparatus comprising;
   a light source located in the refrigerator;
   an adjustable temperature control to set said adjustable temperature levels and the at least one movable indicator connected thereto, said adjustable temperature control associated with the control panel; and
   at least one flexible extruded optical fiber having a first end and a second end and a coiled loop formed therebetween, said first end being arranged so that light emanating from said light source in the compartment enters said first end and is transmitted through said optical fiber so that it exits said second end, said second end being arranged to move in conjunction with and to illuminate said at least one indicator with said transmitted light via said optical fiber when said adjustable temperature control is moved.

4. The apparatus of claim 3, wherein said light source is a refrigerator compartment light bulb.

5. The apparatus of claim 3, further comprising:
   a translucent part, having at least one color, and arranged so that the light exiting said second end of said optical fiber is incident on said translucent part to provide a color display at said at least one indicator.

6. The apparatus of claim 3, further comprising:
   a slide bar thermostat control connected to said at least one indicator.

7. The apparatus of claim 3, wherein said at least one flexible extruded optical fiber is formed to be fixed at said first end and said second end and movable in a substantial region in between said ends.

8. The apparatus of claim 3, further comprising:
   a resilient mount at each of said first end and at said second end of said at least one flexible extruded optical fiber to fix said ends of said at least one flexible extruded optical fiber.

9. A refrigerator having a compartment constructed to maintain adjustable temperature levels therein set by a user via a control panel, comprising:
   a light source;
   an adjustable temperature control to set said adjustable temperature levels and at least one movable indicator connected thereto, said adjustable temperature control associated with the control panel located in the refrigerator;
   at least one flexible extruded optical fiber having a first end and a second end, said first end being arranged so that light emanating from said light source enters said first end and is transmitted through said flexible optical fiber so that it exits said second end, said second end being arranged to move in conjunction with and to illuminate said at least one indicator with said transmitted light via said flexible optical fiber; and
   a colored translucent part positioned adjacent to said second end and said at least one movable indicator, such that said transmitted light will pass through said translucent part after exiting said second end to provide a colored illumination of said at least one indicator.

10. The refrigerator of claim 9, wherein said light source is a refrigerator compartment light bulb.

11. The refrigerator of claim 9, further comprising:
    a control housing on which said control panel having at least one indicator is mounted and wherein said light source is a refrigerator compartment light bulb located outside of said control housing.

12. The refrigerator of claim 9, wherein said translucent part has multiple colors at spaced locations thereon so that light exiting said second end of said optical fiber is incident on said translucent part to provide a differing color display at said at least one indicator dependent on a location of said movable indicator.

13. The refrigerator of claim 9, further comprising:
    a slide bar thermostat control connected to said at least one indicator.

14. The refrigerator of claim 9, wherein said at least one flexible extruded optical fiber having a first end and a second end further comprises:

said first end fixed to a housing wall on a control housing and said second end connected to said at least one indicator so that a portion of said at least one flexible extruded optical fiber is movable in a substantial region intermediate between said ends.

15. The refrigerator of claim 14, wherein said at least one flexible extruded optical fiber is formed of a flexible material so that it can form a coiled loop.

* * * * *